United States Patent

[11] 3,598,373

[72] Inventor Edward A. Inman
 Lakewood, Colo.
[21] Appl. No. 22,976
[22] Filed Mar. 26, 1970
[45] Patented Aug. 10, 1971
[73] Assignee Coors Porcelain Company
 Golden, Colo.

[54] METHOD AND APPARATUS FOR MAKING SMALL CERAMIC SPHERES
 12 Claims, 4 Drawing Figs.
[52] U.S. Cl. .................................................. 263/6, 263/8
[51] Int. Cl. ................................................. F27b 9/14
[50] Field of Search ....................................... 263/21 A, 8 R, 6 R; 110/40 R

[56] References Cited
UNITED STATES PATENTS
1,565,087 12/1925 Galle ........................ 110/40
2,252,714 8/1941 Hall ........................... 263/8 X Primary Examiner—John J. Camby
Attorney—Barnard, McGlynn & Reising ABSTRACT: A method of making small ceramic spheres by discharging drops of ceramic slip onto a moving bed of powdered material. Maximum sphere density in the bed is achieved by orienting the drop nozzles angularly across the bed and inverting the bed after receiving a first layer of spheres to form a new bed surface. A simple ramp device performs the inversion.

INVENTOR.
Edward A. Inman
BY
Barnard, McGlynn & Reising
ATTORNEYS

METHOD AND APPARATUS FOR MAKING SMALL CERAMIC SPHERES

This invention relates to a method for making small ceramic spheres and to apparatus for carrying out the method.

Relatively small ceramic spheres can be manufactured in quantity by forming a ceramic slip and discharging drops of the slip onto a bed of finely powdered and preferably hydroscopic material. The drops of slip, due to surface tension, form near perfect spheres when placed on a finely powdered bed material. The spheres are then dried and, after separation from the bed material, are fired to form the end product. This process is preferably carried out in a substantially continuous fashion using a translating work surface such as a conveyor.

The method set forth above requires the continuous preparation of the powder bed on the translating work surface and the separation of the spheres from the bed material for bed reclamation purposes. Accordingly, it is desirable to obtain at the end of the work surface as high a ratio of spheres to unit volumes of bed powder as possible.

The present invention provides improvements to the method of making ceramic spheres set forth above and results in the production of a high ratio of spheres to unit volumes of bed powder. This is accomplished in accordance with a first feature of the invention by placing drops of ceramic slip on a bed of finely powdered and preferably hydroscopic material and reforming the bed surface, preferably by inverting or overturning the combination of the bed material and the drops of ceramic slip resting thereon. This step effectively forms a new bed surface which subsequently receives a second layer of ceramic slip drops which are subsequently dried to form a second layer of spheres. The dried or at least partially dried spheres are later separated from the bed material and, if desired, are fired to form the end product. The bed "turn over" step may be carried on one or more times depending on the length of the work surface and other factors such as the relative quantity of bed material used.

In accordance with a second feature of the invention, a plurality of nozzles are arranged nonperpendicularly across a translating work surface taken relative to the direction of translation thereof so as to deposit or discharge a high population of drops onto the surface for each unit of surface width. In the preferred form the nozzles are arranged in a straight conduit which in turn is disposed across the work surface in a skewed fashion. However, a staggered or zigzag configuration may also be employed, as will later be made apparent.

The various features and advantages of the subject invention will become more apparent upon reading the following specification which describes a specific embodiment of the invention. This specification is to be taken with the accompanying drawings of which:

Figure 1:
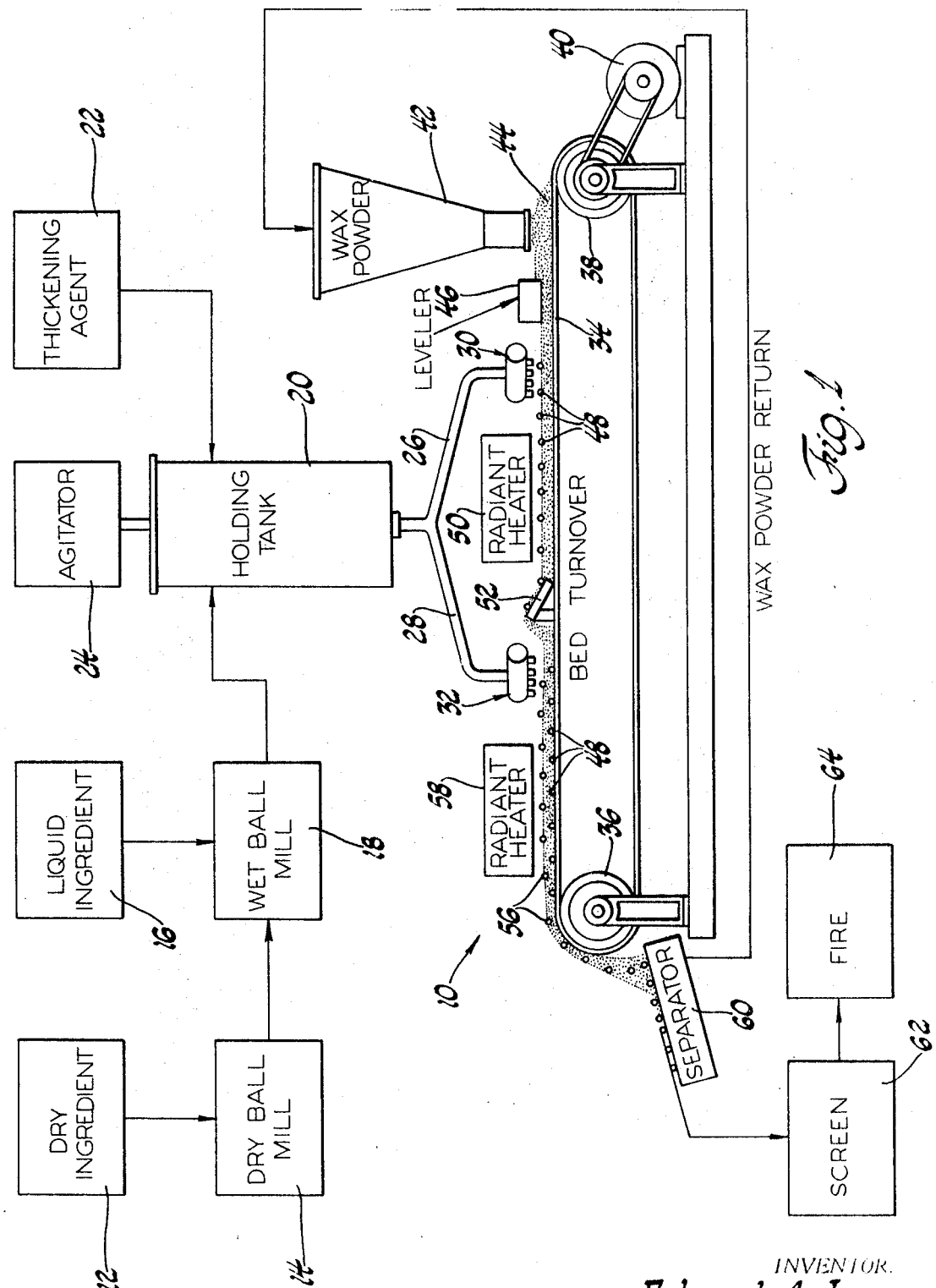
FIG. 1 is a schematic view of an illustrative assembly for carrying out the inventive process for making small ceramic spheres.

Referring to FIG. 1 there is shown in schematic form an assembly 10 for continuously producing relatively small ceramic spheres of the type which are commonly used as milling elements in paint mills and the like. The spheres which are produced by the assembly 10 are fabricated from a ceramic slip or slurry which is prepared by milling a dry ingredient 12, such as unground alumina in a dry ball mill 14. The ground alumina is then transferred from the ball mill 14 along with a liquid ingredient 16, such as water, to a wet ball mill 18 where wet milling is carried on for several hours. In addition to the water, the wet ball mill may also be charged with other ingredients such as an antifoam emulsion, clay, talc, and a color additive. The wet-milled ingredients of the ceramic slip.

Holding tank 20 is connected by means of distribution lines 26 and 28 to nozzle systems 30 and 32, respectively, which are disposed over a horizontal work surface defined by the upper portion of a continuous conveyor belt 34. The nozzle systems 30 and 32 each include a plurality of uniformly spaced nozzles which are arranged in a skewed straight line fashion across the horizontal surface of conveyor belt 34 as will be subsequently described in greater detail. Belt 34 engages a pair of rollers 36 and 38 of which roller 38 is driven by a motor 40 such that the work surface defined by the upper horizontal portion of belt 34 translates uniformly from right to left as shown in FIG. 1.

Disposed over the right-hand end of the belt as shown in FIG. 1 which is also the starting point of the sphere fabrication process steps which take place on the surface of the belt 34 is a hopper 42 which is operated to continuously discharge a quantity of finely powdered and hydroscopic material 44. This powdered material 44 forms a bed on the upper horizontal surface of conveyor belt 34 which is adapted to receive drops of ceramic slip as will be subsequently described. Suitable materials 44 are powdered wax and powdered alumina. A leveler bar 46 extends transversely across the work surface defined by belt 34 so as to level the bed material 44 to the left of the discharge point of the hopper 42.

To the left of the leveler bar 46, as shown in FIG. 1, i.e., in the direction of bed translation, the leveled bed material 44 passes under the first system of nozzles 30 to receive drops of ceramic slip. These drops fall to the surface of the bed material 44 and due to surface tension set up into near perfect spheres 48. The hydroscopic nature of the bed material 44 permits the spheres 48 to sit well on top of the bed material and to dry rapidly. Drying is preferably aided by means of a radiant heater 50 which is disposed over a substantial portion of the work surface so that spheres 48 are at least partially dried as they pass from the far end of the heater during displacement.

The partially dried spheres 48 along with the bed material 44 encounter, to the left of the radiant heater 50 as shown in FIG. 1, an inverting device 52 in the form of a small ramp which causes the spheres 48 and the bed material 44 to be turned over or substantially inverted as they pass over the far end of the inverting device 52. The combination of the bed material 44 and the spheres 48 ride up the inverting device 52 and, upon reaching the top, the spheres 48 fall to the surface of the belt 34 and the bed material 44 falls over the spheres 48 covering them and forming a new bed surface of material 44.

Downstream of the inverting device 52, the second system of nozzles 32 extends across the work surface so as to discharge a second plurality of ceramic slip drops onto the new surface of the inverted combination of spheres 48 and bed material 44. Accordingly, new spheres 56 set up on top of the newly formed bed. The second group of spheres 56 again pass under a radiant heater 58 so as to be dried or at least partially dried prior to reaching the finishing end of the conveyor belt 34. At the finishing end of the conveyor belt 34 the bed material 44 along with the first set of spheres 48 and the second set of spheres 56 fall onto a separating screen 60 which separates all the spheres from the bed material. The bed material is preferably recovered and returned to the hopper 42 as suggested in FIG. 1. The spheres are taken to a set of suitable sizing screens 62 and thence to a kiln for firing as suggested by the schematic step block 64.

Figure 2:
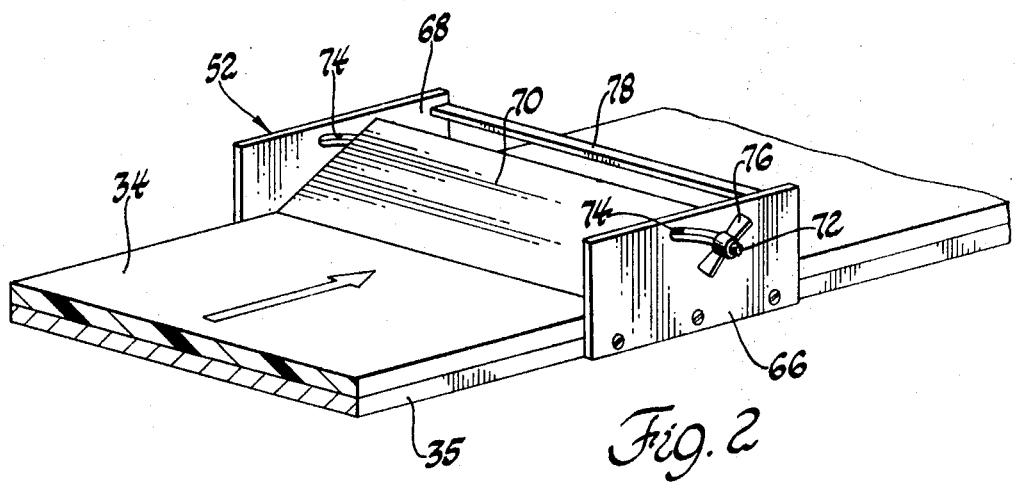
FIG. 2 is a perspective view of an apparatus detail in the assembly of FIG. 1.

Referring to FIG. 2 the inverting device 52 is shown in greater detail. In FIG. 2 the conveyor belt 34 is shown to be translatable from left to right over a polished steel support surface 35 in the direction indicated by the arrow. Fastened to the support surface 35 are upright plates 66 and 68 which together support a ramp 70 which extends across the belt 34 transversely to the direction of translation and which extends upwardly away from the belt 34 in the direction of translation. Ramp 70 is provided on opposite sides with threaded pins 72 which extend through arcuate slots 74 in the plate 66 and 68. The threaded pins 72 receive wing nuts 76 to permit the angle of inclination of the ramp 70 to be varied. A leveler bar 78 is fastened between the upright plates 66 and 68 so as to relevel the bed material after it has gone through the inversion caused by passage over the ramp 70.

It is to be noted in particular that the bed material 44 and the first set of spheres 48 are inverted in relative vertical orientation by passage over the ramp 70. This inversion process does not require that the bed material 44 be of a low density. In fact it has been found that alumina powder is useable as a bed material. In this case, however, it may be desirable to remove alumina particles on or from the partially dried spheres prior to firing. Failure to remove this material may produce a ceramic ball having an irregular surface characteristic.

Figure 3:
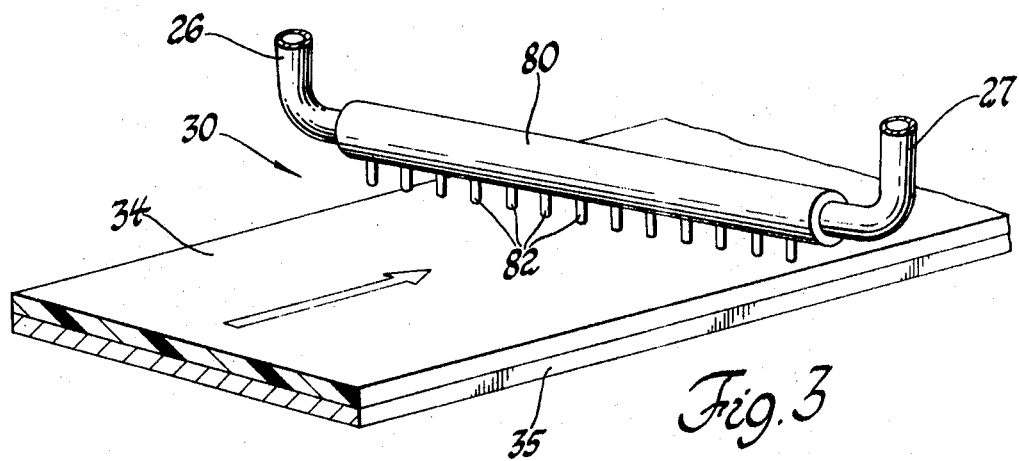
FIG. 3 is a perspective view of a second apparatus detail in the assembly of FIG. 1; and, FIG. 4 is a cross-sectional view of part of the apparatus of FIG. 3.
Figure 4:
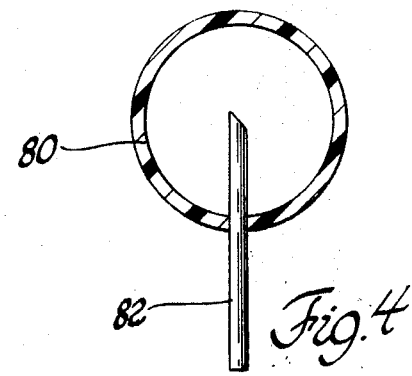

Referring to FIGS. 3 and 4 the nozzle system 30 is shown in detail. It is to be understood that nozzle system 30 is identical to nozzle 32 and, therefore, the representation of FIGS. 3 and 4 may be taken to also represent the nozzle system 32.

Nozzle system 30 includes a hollow cylindrical conduit 80 of relatively thin walled material such as plastic which extends across the work surface defined by the belt 34 and is spaced vertically therefrom. The conduit 80 is skewed so as to be non-perpendicular relative to the path of travel or direction of translation of the belt 34. Distribution conduit 26 enters the inlet end of the conduit 80 and if recirculation is desired a return conduit 27 may also emerge from the opposite end of the conduit 80. A plurality of short hollow needles 82 extend through the lower wall of the conduit 80 as best shown in FIG. 4 and are uniformly distributed across the length of conduit 80 to discharge drops of ceramic slip onto the work surface defined by the belt 34. The needles 82 may be placed in the conduit 80 at the desired positions simply by pushing them through the sidewall of Distribution 80 far enough to remain in place.

It is to be understood that the foregoing description of the assembly 10 and the process which is carried out using the assembly 10 is illustrative in nature and is not to be construed as limiting the invention to the exact arrangement shown. It is also to be understood that while alumina has been suggested as the ceramic material from which to form the slip and ultimately to form the spheres other ceramic or ceramiclike materials can be employed.

The embodiments of the invention in which I claim an exclusive property or privilege are defined as follows:

1. A method for making small ceramic spheres comprising the steps of: placing a bed of powdered material on a work surface; discharging first drops of ceramic slip onto the surface of the bed to form first ceramic spheres; substantially reforming the bed surface on the work surface; and discharging second drops of ceramic slip onto the reformed bed to form additional ceramic spheres.

2. A method for making small ceramic spheres comprising the steps of: placing a bed of powdered material on a work surface; translating the work surface; discharging first drops of ceramic slip onto the bed to form first ceramic spheres; drying the drops; substantially inverting the bed material and first spheres on the translating work surface; discharging second drops of ceramic slip onto the inverted bed to form additional spheres; drying the second drops; and, separating the spheres from the bed material.

3. The method of claim 2 wherein the ceramic slip contains alumina as the essential ceramic ingredient.

4. The method of claim 2 including the additional step of firing the separated spheres.

5. The method of claim 2 wherein the bed material is hydroscopic.

6. A method for making small fired ceramic spheres comprising the steps of: placing a substantially uniform bed of finely powdered hydroscopic material onto a horizontally translatable work surface; discharging ceramic slip through a first plurality of nozzles arranged across the work surface to form first drops of such slip on the bed material; drying the drops; directing the bed material and the dried first drops over a ramp to overturn the same; discharging ceramic slip through a second plurality of nozzles arranged across the work surface to form second drops on the overturned bed; drying the second drops; separating the first and second drops from the bed material; and firing the fried drops to form the spheres.

7. The method of claim 6 wherein at least the first plurality of nozzles are arranged nonperpendicularly across the bed relative to the direction of translation of the work surface.

8. Apparatus for making small ceramic spheres comprising: conveyor means for defining a horizontally translatable work surface; means for placing finely powdered material on the surface to form a bed; a system of nozzles arranged over the surface for discharging drops of ceramic slip thereon; and means extending across the surface for overturning the bed material and drops as the surface is translated.

9. Apparatus as defined in claim 8 wherein the means for overturning the bed includes a ramp extending across the work surface and inclined upwardly therefrom in the direction of translation.

10. Apparatus as defined in claim 9 including means to level the overturned bed.

11. Apparatus as defined in claim 9 wherein the nozzles are arranged nonperpendicularly across the work surface relative to the direction of translation thereof.

12. Apparatus as defined in claim 11 wherein the system of nozzles comprises a horizontal conduit having an inlet at one end, and a plurality of vertical hollow needles extending through the wall of the conduit.